United States Patent [19]

Bowlin et al.

[11] Patent Number: 4,880,468
[45] Date of Patent: Nov. 14, 1989

[54] WASTE SOLIDIFICATION COMPOSITION AND METHODS

[75] Inventors: David A. Bowlin, Cortland; Michael J. Seyman, Warren, both of Ohio

[73] Assignee: Halliburton Services, Duncan, Okla.

[21] Appl. No.: 250,872

[22] Filed: Sep. 29, 1988

[51] Int. Cl.$^4$ ................................. C04B 7/02
[52] U.S. Cl. ........................... 106/98; 106/85; 106/DIG. 1; 501/155
[58] Field of Search .............. 106/98, DIG. 1, 85; 501/155

[56] References Cited

U.S. PATENT DOCUMENTS

| | | | |
|---|---|---|---|
| 1,436,061 | 11/1922 | Stryker et al. | 106/76 |
| 1,456,303 | 5/1923 | Ekstrom | 106/84 |
| 1,463,123 | 7/1923 | McAllister | 106/76 |
| 1,470,674 | 10/1923 | Amies | 106/84 |
| 1,757,470 | 5/1930 | Peebles | 106/84 |
| 2,016,796 | 10/1935 | Brock et al. | 18/47.5 |
| 2,809,118 | 10/1957 | Kell | 106/84 |
| 3,383,228 | 5/1968 | Rekate et al. | 106/84 |
| 3,837,872 | 9/1974 | Conner | 106/74 |
| 4,338,134 | 7/1982 | Graf zu Munster | 106/85 |
| 4,460,292 | 7/1984 | Durham et al. | 405/129 |
| 4,615,809 | 10/1986 | King | 210/751 |
| 4,668,128 | 6/1987 | Hartley et al. | 405/266 |

FOREIGN PATENT DOCUMENTS

| | | | |
|---|---|---|---|
| 58-36962 | 3/1983 | Japan | 106/98 |
| 60-112660 | 6/1985 | Japan | 106/98 |
| WO80/00959 | 5/1980 | PCT Int'l Appl. | 106/98 |
| 2148871 | 6/1985 | United Kingdom | 106/98 |

*Primary Examiner*—William R. Dixon, Jr.
*Assistant Examiner*—Deborah Jones
*Attorney, Agent, or Firm*—Robert A. Kent

[57] ABSTRACT

A waste solidification composition comprising hydraulic cement, fly ash and fumed silica material is provided. Also provided are a method of solidifying agglomerations of solid and liquid waste materials and a method of disposing of waste materials such as drilling muds and cuttings that result from the drilling of an oil and gas well.

5 Claims, No Drawings

WASTE SOLIDIFICATION COMPOSITION AND METHODS

BACKGROUND OF THE INVENTION

1. Field of the Invention

The present invention relates to compositions and methods for solidifying agglomerations of solid and liquid waste materials and to methods of disposing waste materials such as drilling muds and cuttings that result from the drilling of oil and gas wells.

2. Description of the Prior Art

Liquid drilling fluid or drilling mud is an essential part of most oil and gas drilling operations. The mud is continuously circulated through the drill pipe, out through the drill bit and back to the surface through the annulus between the drill pipe and the casing. It serves to lubricate and cool the drill bit as the drill bit breaks up rock at the bottom of the hole, and it carries the rock cuttings to the surface. The mud also helps control pressures that exist in formations penetrated by the drill bit, stabilizes the hole by sheathing the wall of the hole and serves as a valuable source of downhole information.

When mud that has been circulated through the well reaches the surface, it is usually conducted through certain solids removal equipment such as shale shakers and settling tanks and then recirculated through the well. Eventually, the mud wears out and must be replaced by new mud. The used mud, together with drill cuttings and other material brought to the surface by the mud, is typically discharged into a pit that has been excavated adjacent the well. At the conclusion of the drilling operation, the agglomeration of mud and other materials in the pit must be disposed of so that the well site can be restored to a proper condition.

Disposing of the agglomeration of mud and other materials in the pit has not been an easy task. The agglomeration of materials usually exists in the form of a semisolid slurry that has no significant stability. Inasmuch as the materials usually involve brine and other potential contaminants and tend to leach and flow out of the area in which they are contained, they cannot be simply dumped on or spread out over the well site. As a result, several methods of disposing of the drilling mud and other materials agglomerated in mud pits have been developed.

A widely used method of disposing of drilling mud and other materials agglomerated in mud pits comprises the step of burying the agglomeration of materials directly on the well site. In carrying out this method, the pits are first allowed to settle for approximately one week. Free water standing in the pits is then removed and hauled to salt water disposal wells. Deep lateral trenches are excavated adjacent the pit and a portion of the soupy agglomeration of mud and other materials in the pit is allowed to flow into the trenches. The original pit and lateral trenches are then filled with dirt. Although this method may allow the surface of the land to be restored to an acceptable condition, it is not always environmentally safe. The buried materials can ooze or leach from the pit and adjacent trenches and contaminate the surrounding soil and ground waters.

Drilling mud and other materials agglomerated in mud pits have also been disposed of by hauling the materials to an approved landfill. A in the first method described above, the pits are first allowed to settle and free water is removed therefrom. The remaining materials in the pits are loaded onto dump trucks with a backhoe and trucked to the landfill site. This method is very costly and is generally used only in states where it is required.

Other methods of disposing of drilling muds and other materials agglomerated in mud pits include the step of solidifying or rigidifying the materials in the pits and then either hauling the materials away or burying them directly in the pits. In U.S. Pat. No. 4,460,292 issued July 17, 1984, a method is disclosed in which biogenetic silica such as rice hull ash is added by itself or together with additives to the mud and other materials in the pit to transform the mud and other materials into a solid or semi-solid mass so that they can be removed from the pit and hauled away. In U.S. Pat. No. 4,668,128 issued May 26, 1987, a method is disclosed in which hydroscopic powder and a cementitious binder are admixed with the mud and other materials in the pit to produce a rigid, form-stable matrix. The matrix is then buried in the pit.

The methods in which mud and other materials agglomerated in the pit are solidified or rigidified result in less contamination than the other methods of disposing of drilling mud and other materials developed heretofore. Such methods can be very economically carried out if the solidified or rigidified agglomeration of drilling mud and other materials can be buried directly on the well site.

By the present invention, an improved waste solidification composition is provided. The composition very effectively solidifies drilling mud and other materials agglomerated in a mud pit during the drilling of an oil and gas well. The solidified agglomeration of mud and other materials can be buried directly in the pit, thereby eliminating the cost of hauling the agglomeration away.

SUMMARY OF THE INVENTION

In one aspect, the present invention comprises a waste solidification composition. The waste solidification composition comprises hydraulic cement, fly ash and fumed silica material.

In another aspect, the present invention provides a method of solidifying an agglomeration of solid and liquid waste materials. The method comprises the steps of admixing a waste solidification composition with the agglomeration, and allowing the admixture of the waste solidification composition and the agglomeration to harden. The waste solidification composition comprises hydraulic cement, fly ash and fumed silica material.

In yet another aspect, the present invention provides a method of disposing of drilling muds, drill cuttings and other waste materials resulting from the drilling of a well. The method comprises the steps forming an agglomeration of the drilling muds, drill cuttings and other waste materials in a pit excavated in the ground, admixing a waste solidification composition with the agglomeration and allowing the admixture of the waste solidification composition and the agglomeration to harden. The waste solidification composition comprises hydraulic cement, fly ash and fumed silica material.

A principal object of the present invention is to provide an improved method of disposing drilling muds, drill cuttings and other waste materials resulting from the drilling of an oil and gas well whereby potential contamination of the environment by the waste materials is minimized.

The methods in which mud and other materials agglomerated in the pit are solidified or rigidified result in less contamination than the other methods of disposing of drilling mud and other materials developed heretofore. Such methods can be very economically carried out if the solidified or rigidified agglomeration of drilling mud and other materials can be buried directly on the well site.

By the present invention, an improved waste solidification composition is provided. The composition very effectively solidifies drilling mud and other materials agglomerated in a mud pit during the drilling of an oil and gas well. The solidified agglomeration of mud and other materials can be buried directly in the pit, thereby eliminating the cost of hauling the agglomeration away.

SUMMARY OF THE INVENTION

In one aspect, the present invention comprises a waste solidification composition. The waste solidification composition comprises hydraulic cement, fly ash and fumed silica material.

In another aspect, the present invention provides a method of solidifying an agglomeration of solid and liquid waste materials. The method comprises the steps of admixing a waste solidification composition with the agglomeration, and allowing the admixture of the waste solidification composition and the agglomeration to harden. The waste solidification composition comprises hydraulic cement, fly ash and fumed silica material.

In yet another aspect, the present invention provides a method of disposing of drilling muds, drill cuttings and other waste materials resulting from the drilling of a well. The method comprises the steps forming an agglomeration of the drilling muds, drill cuttings and other waste materials in a pit excavated in the ground, admixing a waste solidification composition with the agglomeration and allowing the admixture of the waste solidification composition and the agglomeration to harden. The waste solidification composition comprises hydraulic cement, fly ash and fumed silica material.

A principal object of the present invention is to provide an improved method of disposing drilling muds, drill cuttings and other waste materials resulting from the drilling of an oil and gas well whereby potential contamination of the environment by the waste materials is minimized.

Numerous other objects, features and advantages of the present invention will be readily apparent to those skilled in the art upon a reading of the following disclosure including the examples provided therewith.

DESCRIPTION OF THE PREFERRED EMBODIMENTS

In accordance with the present invention, a waste solidification composition is provided. Also provided are a method of solidifying an agglomeration of solid and liquid waste materials and a method of disposing of drilling mud, drill cuttings and other waste materials resulting from the drilling of an oil and gas well. The waste solidification composition is used in both methods.

The waste solidification composition comprises hydraulic cement, fly ash and fumed or pyrogenic silica material. It can be used to solidify any agglomeration of solid and liquid waste materials. The waste solidification composition converts the agglomeration of solid and liquid waste materials into an environmentally safe, hard soil-like material. It prevents the waste materials from leaching out of the area in which they are contained.

Any hydraulic cement can be used in forming the waste solidification composition. Preferably, Portland cements of the various types identified as ASTM Type I-V or API Classes A-H and J cements are utilized. These cements are identified and defined in ASTM Standard C 150-88 or *API Specification for Materials and Testing for Well Cements,* API Spec. 10, Second Edition, June 15, 1984, of the American Petroleum Institute which are incorporated herein by reference.

The fumed silica material used in forming the waste solidification composition comprises predominately a finely divided, high surface area amorphous silica material. The material can be produced in a variety of ways, including vapor phase hydrolysis of silicon halides, vaporization of silicon dioxide, and as a by-product resulting from vaporization of various silicon compounds. The fumed silica material typically has an average particle size in the range of from about 0.18 to about 0.26 micrometers and comprises at least about 80 percent by weight silica, $SiO_2$. The material typically has a specific surface area of from about 15 to about 30 square meters per gram and a specific gravity of from about 2.2 to about 2.6.

When the waste solidification composition is admixed with solid and liquid waste materials, the cement hydrates. As the cement hydrates, heat is generated and various hydration products are formed. One of the hydration products formed as the cement hydrates is calcium hydroxide. The calcium hydroxide reacts with the fly ash and fumed silica material of the composition which prevents free calcium hydroxide from leaching and improves the strength of the solidified materials.

The fumed silica material of the composition acts to absorb water from the solid and liquid waste materials and thereby allows the cement to build greater strength. The fumed silica material also acts as a low temperature accelerator to counteract the retarding effects of concentrated salts in the waste materials and serves to reduce the permeability of the solidified agglomeration of waste materials thereby minimizing the problems of materials leaching therefrom.

The amount of each component used to form the composition varies depending upon many factors, including the nature of the solid and liquid waste materials to be agglomerated. Preferably, the waste solidification composition comprises in the range of from about 60% to about 98% by weight hydraulic cement, from about 1% to about 20% by weight fly ash and from about 1% to about 20% by weight fumed silica material. More preferably, the waste solidification composition comprises in the range of from about 80% to about 85% by weight hydraulic cement, from about 5% to about 15% by weight fly ash and about 10% by weight fumed silica material.

The inventive method of solidifying an agglomeration of solid and liquid waste materials comprises the steps of admixing the waste solidification composition of the invention with the agglomeration, and allowing the admixture of the waste solidification composition and the agglomeration to harden. The agglomeration of solid and liquid waste materials is hardened into an environmentally acceptable, hard soil-like material. The hard soil-like material can be loaded onto trucks and hauled away for disposal or can be buried on location.

The amount of the waste solidification composition admixed with the agglomeration of solid and liquid waste materials varies depending upon many factors, including the nature of the materials and the set time desired. The waste solidification composition is preferably admixed with the agglomeration of solid and liquid waste materials in an amount such that the ratio of the amount of the agglomeration to the amount of the waste solidification composition present in the admixture is from about 10 to about 20 cubic feet of the agglomeration to about 100 pounds of the waste solidification composition. More preferably, the waste solidification composition is admixed with the agglomeration in an amount such that the ratio of the amount of the agglomeration to the amount of the waste solidification composition present in the admixture is from about 10 to about 15 cubic feet of the agglomeration to about 100 pounds of the waste solidification composition.

Although the inventive waste solidification composition can be used in any method of solidifying solid and liquid waste materials, it is particularly useful in methods of solidifying drilling muds, drill cuttings and other waste materials resulting from the drilling of an oil and gas well. The inventive method of disposing of drilling muds, drill cuttings and other waste materials resulting from the drilling of a well comprises the steps of forming an agglomeration of the drilling muds, drill cuttings and other waste materials in a pit excavated in the ground adjacent the well, admixing the waste solidification composition of the invention with the agglomeration and allowing the admixture of the waste solidification composition and the agglomeration to harden.

The pit excavated in the ground adjacent the well can be formed in any shape. Preferably, the pit is square or rectangular in shape so that the waste solidification composition can be easily admixed with the drilling mud and other materials contained therein and so that the volume of the drilling mud and other materials contained in the pit can be easily determined.

Preferably the agglomeration of drilling muds, drill cuttings and other waste materials in the pit is allowed to settle for approximately one week, and all or substantially all of the free water standing in the pit is removed before the waste solidification composition is admixed with the agglomeration. The free water standing in the pit can be removed by vacuum trucks and hauled to salt water disposal wells. After the drilling muds and other materials in the pit have settled and free water standing in the pit has been removed, the waste solidification composition is admixed with the agglomeration remaining in the pit. The waste solidification composition is preferably blown into the pit by a pneumatic bulk truck and admixed with the agglomeration using a backhoe. The agglomeration is agitated until a uniform mix is achieved. Once a uniform mix is achieved, the mix is allowed to set into a hard mass. The set time of the mix varies depending upon many factors, including the ratio of the amount of the agglomeration to the amount of the waste solidification composition present in the admixture. Generally, the mix sets within a time period of from about 6 hours to about 72 hours.

The waste solidification composition chemically reacts with the drilling muds and other materials in the pit to convert the materials into a hard, soil-like material. The waste solidification composition prevents the waste materials from leaching out of the pit.

The agglomeration of drilling mud, drill cuttings and other materials in the pit can be buried after the agglomeration sets. It can be buried by backfilling the pit with dirt which restores the surface of the land to its original condition.

The amount of the waste solidification composition admixed with the agglomeration of drilling mud, drill cuttings and other waste materials in the pit varies based upon many factors, including the set time desired. Preferably, the waste solidification composition is admixed with the agglomeration in an amount such that the ratio of the amount of the agglomeration to the amount of the waste solidification composition present in the admixture is from about 10 to about 20 cubic feet of the agglomeration to about 100 pounds of the waste solidification composition. More preferably, the waste solidification composition is admixed with the agglomeration in an amount such that the ratio of the amount of the agglomeration to the amount of the waste solidification composition present in the admixture is about 10 to about 15 cubic feet of the agglomeration to about 100 pounds of the waste solidification composition. Generally, a ratio of about 15 cubic feet of the agglomeration to about 100 pounds of the waste solidification composition will result in a set time in the range of from about 6 to about 12 hours. A ratio of from about 17 to about 18 cubic feet of the agglomeration to about 100 pounds of the waste solidification composition will result in a set time of from about 48 to about 72 hours. In some applications, the amount of the cement and fumed silica material used to form the waste solidification composition can be decreased, the amount of fly ash used to form the composition can be increased and the amount of the composition admixed with the agglomeration of drilling muds, drill cuttings and other waste materials can be decreased without affecting the overall effectiveness of the composition.

As stated previously, the waste solidification composition of the present invention is particularly suitable for solidifying agglomerations of drilling muds, drill cuttings and other waste materials resulting from the drilling of an oil and gas well. All of the materials forming the composition can be easily obtained. The high surface area of the fumed silica material very effectively absorbs water from the waste materials. Inasmuch as water in the waste materials is usually high in salt content, the fact that the fumed silica material acts as a low temperature accelerator for saturated salt slurries is a great advantage. If large quantities of salt are present in the waste materials, admixtures of cement and fly ash alone may not set for weeks, if at all.

The waste solidification composition solidifies the agglomeration of drilling muds, drill cuttings and other waste materials in the pit in a short amount of time. In most cases, the agglomeration can be solidified and covered with dirt in one day and the land can be restored to its original condition shortly thereafter. The waste disposal method of the present invention is much less expensive than other disposal methods used heretofore. The method results in reduced trucking costs and eliminates the necessity of hauling drilling wastes out of environmentally sensitive areas. Inasmuch as the cost of digging deep lateral trenches adjacent the pit is eliminated, the disposal method of the present invention is usually less expensive than other on-site burial methods used heretofore.

In some drilling operations, the mud pit comprises one or more above-ground tanks or containers as opposed to a pit excavated in the ground. The agglomeration of drilling mud and other materials in such above-ground containers can be solidified therein in accordance with the invention just as if it was formed in a pit excavated in the ground. The solidified agglomeration can then be removed from the container and buried or hauled away. The solidified form of the agglomeration makes it much safer and easier to haul.

In order to illustrate a clear understanding of the composition and methods of the present invention, the following examples are given. Although the examples are presented to illustrate certain specific embodiments of the invention, they are not to be construed as to be restrictive of the scope and spirit thereof.

EXAMPLE I The waste solidification composition of the invention was used to solidify drilling muds, drill cuttings and other waste materials resulting from the drilling of an oil and gas well. The drilling muds, drill cuttings and other waste materials were disposed into two pits excavated in the ground adjacent the well. The first pit was 65 feet long, 12 feet wide and four feet deep and the second pit was 65 feet long, 16 feet wide and 3½ feet deep. The total volume of waste materials in the pits was 6660 cubic feet.

The waste solidification composition used to solidify the waste materials in the pits comprised about 80% by weight Portland cement, about 11% by weight fly ash and about 9% by weight fumed silica material. A pneumatic bulk truck was used to blow the waste solidification composition into the pits. The waste solidification composition and the waste materials in the pits were then agitated with a backhoe until uniform mixes were achieved. A total quantity of 42,500 pounds of the waste solidification composition was admixed with the waste materials in the pits at a ratio of about 100 pounds of the composition for every 16 cubic feet of the waste materials.

Within about 48 hours, the admixtures of the waste solidification composition and the waste materials in the pits set into a hard mass. The pits were covered with dirt to restore the surface of the land surrounding the well site to its original condition.

EXAMPLE II

The waste solidification composition of the invention was used again to solidify drilling muds, drill cuttings and other waste materials that were disposed in two pits excavated in the ground adjacent an oil and gas well. This time, both pits were 70 feet long, 10 feet wide and 4 feet deep. The total volume of waste materials in the pits was 5600 cubic feet.

As in the first Example, the waste solidification composition used to solidify the waste materials in the pits comprised about 80% by weight Portland cement, about 11% by weight fly ash and about 9% by weight fumed silica material. A pneumatic bulk truck was used to blow the waste solidification composition into the pits. The waste solidification composition and waste materials in the pits were then agitated with a backhoe until uniform mixes were achieved. A total quantity of 50,000 pounds of the waste solidification composition was admixed with the waste materials in the pits at a ratio of about 100 pounds of the composition for every 11 cubic feet of the waste materials.

Within about 24 hours, the admixtures of the waste solidification composition and the waste materials in the pits set into a hard mass. The pits were then covered with dirt to restore the surface of the land surrounding the well site to its original condition.

The preceding examples can be repeated with similar success by substituting the generically or specifically described reactants and/or operating conditions of this invention for those used in the examples.

Although certain preferred embodiments of the invention have been described for illustrative purposes, it will be appreciated that various modifications and innovations of the composition and methods recited herein may be effected without departure from the basic principles which underlie the invention. Changes of this type are therefore deemed to lie within the spirit and scope of the invention except as may be necessarily limited by the amended claims and reasonable equivalents thereof.

What is claimed is:

1. A method of solidifying an agglomeration of solid and liquid waste materials resulting from drilling operations comprising:
admixing a waste solidification composition with said agglomeration in an amount of about 100 pounds per 10 to 20 cubic feet of agglomeration, said waste solidification composition consisting essentially of: hydraulic cement present in an amount of from about 60 to 98% by weight of said composition; fly ash present in an amount of rom about 1 to to about 20% by weight of said composition; and fumed silica material present in an amount of form about 1 to about 20% by weight of said composition; and
allowing said admixture of said waste solidification composition and said agglomeration to harden.

2. The method of claim 1 wherein said hydraulic cement of said waste solidification composition is Portland cement.

3. The method of claim 2 wherein said fumed silica material of said waste solidification composition comprises at least about 80 percent by weight silica.

4. The method of claim 1 wherein said waste solidification composition comprises in the range of from about 80% to about 85% by weight hydraulic cement, from about 5% to about 15% by weight fly ash and about 10% by weight fumed silica.

5. The method of claim 1 wherein said waste solidification composition is admixed with said agglomeration in an amount such that the ratio of the amount of the agglomeration to the amount of the waste solidification composition present in said admixture is from about 10 to about 15 cubic feet of the agglomeration to about 100 pounds of the waste solidification composition.

* * * * *